(No Model.)
2 Sheets—Sheet 1.

J. D. WARD.
METHOD OF MANUFACTURING HOLLOW ARTICLES FROM PYROXYLINE COMPOUNDS.

No. 439,451.
Patented Oct. 28, 1890.

Witnesses,
Robt Errett
J. A. Rutherford

Inventor
Joseph D. Ward,
By James L. Norris
Atty.

(No Model.) 2 Sheets—Sheet 2.
J. D. WARD.
METHOD OF MANUFACTURING HOLLOW ARTICLES FROM PYROXYLINE COMPOUNDS.
No. 439,451. Patented Oct. 28, 1890.
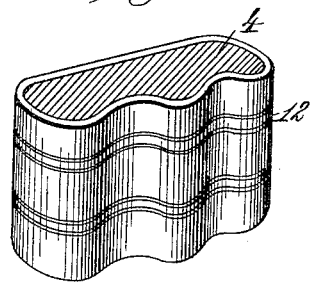
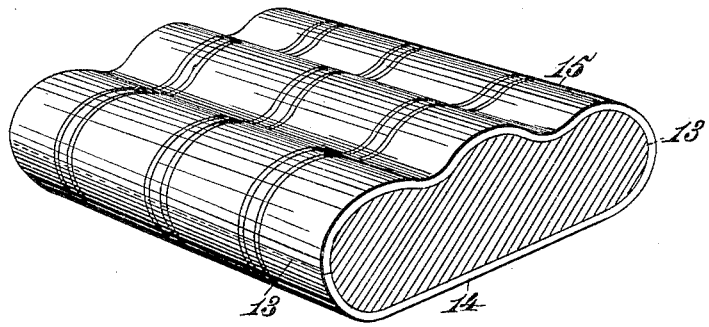

UNITED STATES PATENT OFFICE.

JOSEPH D. WARD, OF ZYLONITE, MASSACHUSETTS, ASSIGNOR TO THE UNITED ZYLONITE COMPANY, OF SAME PLACE.

METHOD OF MANUFACTURING HOLLOW ARTICLES FROM PYROXYLINE COMPOUNDS.

SPECIFICATION forming part of Letters Patent No. 439,451, dated October 28, 1890.

Application filed July 14, 1890. Serial No. 358,671. (No model.)

*To all whom it may concern:*

Be it known that I, JOSEPH D. WARD, a citizen of the United States, residing at Zylonite, in the county of Berkshire and State of Massachusetts, have invented new and useful Improvements in the Method of Manufacturing Hollow Articles from Pyroxyline Compounds, of which the following is a specification.

This invention has for its object to provide a novel, economical, and efficient method or process of manufacturing ornamental hollow articles—such as jewel and other boxes—from zylonite and other nitro-cellulose or pyroxyline compounds.

The invention consists, essentially, in stretching a tube of the material upon a cylindrical mandrel or support, turning the tube in a lathe or otherwise to equalize its thickness and remove imperfections or trace or cut ornaments therein, removing the turned tube from said mandrel, and subsequently shaping it into the desired configuration by drawing it over and shrinking it upon a removable shaping mandrel or core conformed to the shape of the article it is desired to produce.

The invention also consists in stretching a tube of the material upon a cylindrical mandrel or support, turning the tube in a lathe or otherwise to equalize its thickness and remove imperfections or trace or cut ornaments therein, severing the tube by an annular incision to separate it into two separate sections, removing these sections and fitting them together, and then drawing the sections over and shrinking them upon a shaping mandrel or core having an external configuration conforming to the outline or shape of the article it is desired to produce.

Figure 1:
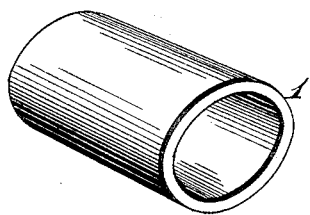
Figure 2:
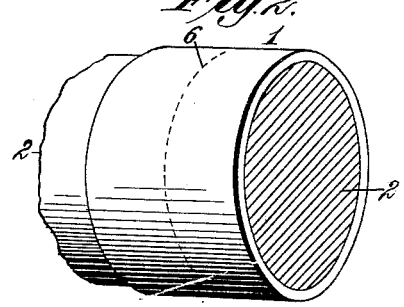
Figure 3:
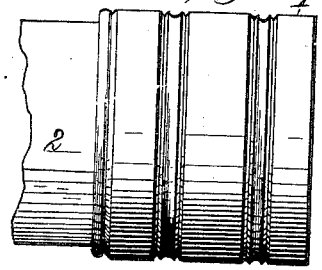
Figure 4:
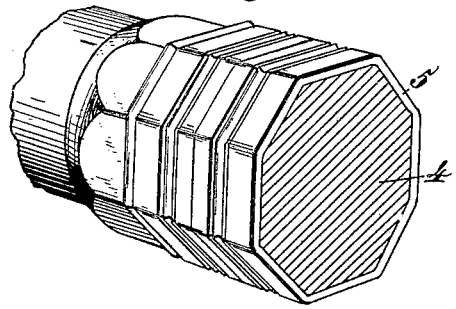
Figure 5:
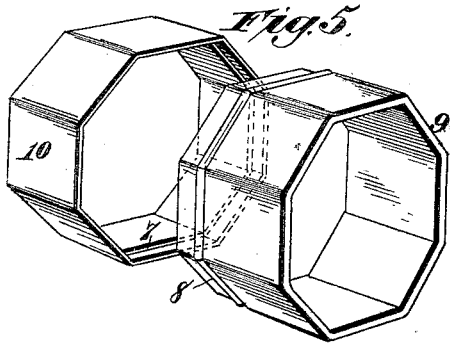
Figure 6:
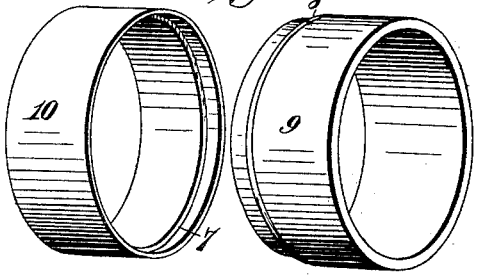
Figure 8:
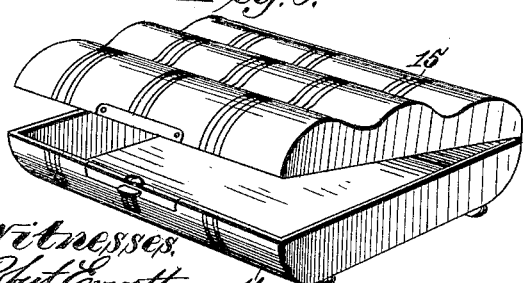
Figure 7:
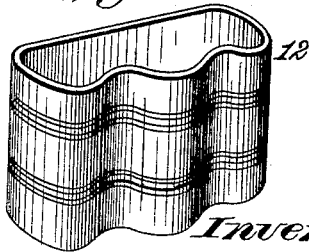

In the accompanying drawings, illustrating the invention, Figure 1 is a perspective view of a tube of zylonite or other nitro-cellulose or pyroxyline compound. Fig. 2 is a perspective view showing the tube stretched on a mandrel or support for attachment to a lathe for turning the tube. Fig. 3 is a side elevation showing the tube stretched on the mandrel or support and turned with an ornamental surface. Fig. 4 is a perspective view showing the ornamented tube shrunk on a shaping mandrel or core. Figs. 5 and 6 are perspective views of differently-shaped boxes divided by annular incisions to form separable box-bodies and box-lids. Fig. 7 is a perspective view of a shaped tube adapted as a box-body or other novelty without being divided into separable sections. Fig. 8 is a similar view showing a complete box comprising a box-body and a box-lid. Figs. 9 and 10 are perspective views showing the manner of shaping and producing the boxes represented by Figs. 7 and 8.

In carrying my invention into practice I produce a tube 1 from zylonite or other pyroxyline compound by a stuffing-machine or otherwise, and this irregular or crude tube in a warm or heated condition is drawn or forced upon a cylindrical mandrel or support 2, of greater diameter than the original tube, which latter shrinks and hardens on cooling and closely hugs the mandrel or support. This mandrel, carrying the tube, is then placed in a turning-lathe, and the tube is turned to equalize its thickness and remove imperfections. The surface may be traced or cut with any desired ornamental designs—such as represented in Fig. 3, which shows a tube on the mandrel or support 2 after being turned and ornamented. The ornamentation as regards special designs is not indispensable, for the tube could be simply turned with a true surface to equalize its thickness and remove imperfections in its exposed surface. The truly-turned tubular structure is drawn or placed over a shaping mandrel or core 4, having an external configuration conforming to the shape of the box or other hollow object it is desired to produce. The truly-turned tubular structure on the shaping mandrel or core 4 is thus rewarmed or reheated until it shrinks sufficiently to conform to shape of such mandrel or core. For example, the shaping mandrel or core 4 may be polygon in cross-section, as in Fig. 4; but obviously the form is only typical of one of the many shapes that can be adopted to suit the conditions required for the special form or article to be produced. The tubular structure on cooling hardens and retains the exact external form or shape of the shaping mandrel or core. The tubular structure may now be removed and used as a box-body or for any other purpose—as, for instance, a novelty in zylonite or pyroxyline goods—it only being necessary to apply a bottom piece and a lid or cover to produce a box; but the invention involves a further procedure, by which the shaped tube itself constitutes the body portion and also the lid or cover portion. To accomplish this result, the stretched tubular structure, Fig. 2, on stretching-mandrel 2 may be sawed or otherwise severed by an annular incision on the line 6, Fig. 2, to divide the stretched tube into two separate sections, which are coextensive, or approximately so, in size. These sections are subsequently turned to provide one with an internal annular shoulder or lip 7 and the other with an external annular shoulder or lip 8, whereby one section can slip into the other section and constitute the separable box-body 9 and box-lid 10, as shown in Fig. 6. The box-body 9 and box-lid 10 are then put together by means of the internal annular shoulder or lip 7 and external annular shoulder or lip 8, and while they are together are drawn or forced over a shaping mandrel or core 4, having an external configuration conforming to the shape of the box desired. The sections, if used to produce a box, will be provided with inserted or otherwise attached disks of zylonite or other pyroxyline compound to constitute the bottom wall of the box-body and the top wall of the box-lid. Instead, however, of sawing or otherwise severing the tube on the annular line 6 while such tube is on the cylindrical mandrel or support 2, as described with reference to Fig. 4, I may remove the truly turned or dressed tube from the cylindrical mandrel or support 2, and then shape it on a shaping mandrel or core 4, as in Fig. 9, and when the structure cools, shrinks, and hardens it can be removed from the shaping mandrel or core and used as a novelty, such as a box-body 12, Fig. 7. This type of box may or may not be provided with a hinged or other movable lid or cover. The shaped tubular structure formed on the shaping mandrel or core 4, as in Fig. 10, may be sawed or otherwise severed longitudinally on its median line, as at 13, to divide it into a box-body 14 and a handsomely-shaped box lid or cover 15, which parts may be hinged at one edge, and thereby produce a jewel or other box, such as represented in Fig. 8.

By this method or process the form of the completed articles may be indefinitely extended, and it will therefore be understood that the shapes illustrated are merely typical to enable the invention to be more readily and clearly understood.

Having thus described my invention, what I claim is—

1. The method herein described of manufacturing hollow articles from zylonite or other pyroxyline compounds, which consists in stretching a tube of the material upon a mandrel, turning the surface of the tube, removing the tube, and shaping it into the desired form by drawing it over a removable shaping mandrel or core conformed to the shape of the finished article, substantially as set forth.

2. The method herein described of manufacturing hollow articles, such as boxes, of zylonite or other pyroxyline compound, which consists in stretching a tube of the material upon a cylindrical mandrel or support, turning the tube in a lathe or otherwise, severing the tube by an annular incision to separate it into sections, fitting these sections together, and then drawing or forcing the sections over and shrinking them upon a shaping mandrel or core, substantially as set forth.

In testimony whereof I have affixed my signature in presence of two witnesses.

JOSEPH D. WARD.

Witnesses:
F. J. SHERIDAN,
FREDERICK J. JONES.